(12) United States Patent
Brause et al.

(10) Patent No.: US 7,667,931 B1
(45) Date of Patent: Feb. 23, 2010

(54) FLEXIBLE ELECTRICAL INTERCONNECTION WITH ENDS URGED INTO ENGAGEMENT WITH CURVED SURFACES OF A SUPPORT AND HUB IN A MINIATURE HARD DISK DRIVE AND METHOD

(76) Inventors: David D. Brause, 1373 Clemson Dr., Longmont, CO (US) 80503; Brian L. Rappel, 1043 Kiowa Rd., Lyons, CO (US) 80540; Chad A. Bogacz, 13900 Lake Song La., B3, Broomfield, CO (US) 80020

( * ) Notice: Subject to any disclaimer, the term of this patent is extended or adjusted under 35 U.S.C. 154(b) by 600 days.

(21) Appl. No.: 11/385,573

(22) Filed: Mar. 20, 2006

(51) Int. Cl.
*G11B 5/55* (2006.01)

(52) U.S. Cl. .................................. 360/264.2

(58) Field of Classification Search ............... 360/264.2
See application file for complete search history.

(56) References Cited

U.S. PATENT DOCUMENTS

| | | | |
|---|---|---|---|
| 4,476,404 A * | 10/1984 | Bygdnes ...................... 310/27 |
| 4,853,800 A | 8/1989 | Schults |
| 4,965,684 A * | 10/1990 | Stefansky ................. 360/78.12 |
| 5,130,895 A * | 7/1992 | Somemiya et al. .......... 361/749 |
| 5,375,021 A | 12/1994 | Boeckner |
| 5,404,257 A | 4/1995 | Alt |
| 5,615,068 A * | 3/1997 | Matsuda et al. .......... 360/264.2 |
| 5,701,220 A * | 12/1997 | Koriyama ................ 360/264.2 |
| 5,745,326 A * | 4/1998 | Koriyama ................ 360/264.2 |
| 5,818,667 A * | 10/1998 | Larson ..................... 360/264.2 |
| 5,862,011 A * | 1/1999 | Sega et al. ............... 360/98.01 |
| 5,901,020 A * | 5/1999 | Koriyama ................ 360/264.2 |
| 5,940,252 A * | 8/1999 | Patterson ................. 360/264.2 |
| 5,953,183 A * | 9/1999 | Butler et al. ............. 360/264.2 |
| 6,243,236 B1 * | 6/2001 | Yamamoto et al. ....... 360/245.9 |
| 6,349,464 B1 * | 2/2002 | Codilian et al. .......... 29/603.03 |
| 6,724,578 B2 * | 4/2004 | Watanabe ................ 360/264.2 |
| 6,934,126 B1 * | 8/2005 | Berding et al. ........... 360/264.2 |
| 7,245,458 B2 * | 7/2007 | Zhang et al. ............. 360/264.2 |
| 7,495,866 B2 * | 2/2009 | Izumi et al. .............. 360/264.2 |
| 2003/0235012 A1 * | 12/2003 | Nishizawa ............... 360/264.2 |

* cited by examiner

*Primary Examiner*—A. J. Heinz
(74) *Attorney, Agent, or Firm*—Workman Nydegger

(57) ABSTRACT

A head stack assembly of a disk drive has a hub including a side margin defining a channel for carrying VCM conductors at least partially around an angular offset such that the conductors are contained within a peripheral outline of the hub and the conductors can extend completely within an overmolding thickness. A first portion of a flexible interconnection biases against a side margin of the hub such that a rotation of the HSA causes a length of the first portion to change. A floating portion of length of the flexible extension follows a semicircular path between a first contact position on the hub and a second contact position on the support surface such that a floating loop diameter is defined between the contact positions. The hub and the support surface can be configured for changing the floating loop diameter with rotation to vary resilient biasing torque to the HSA.

19 Claims, 14 Drawing Sheets

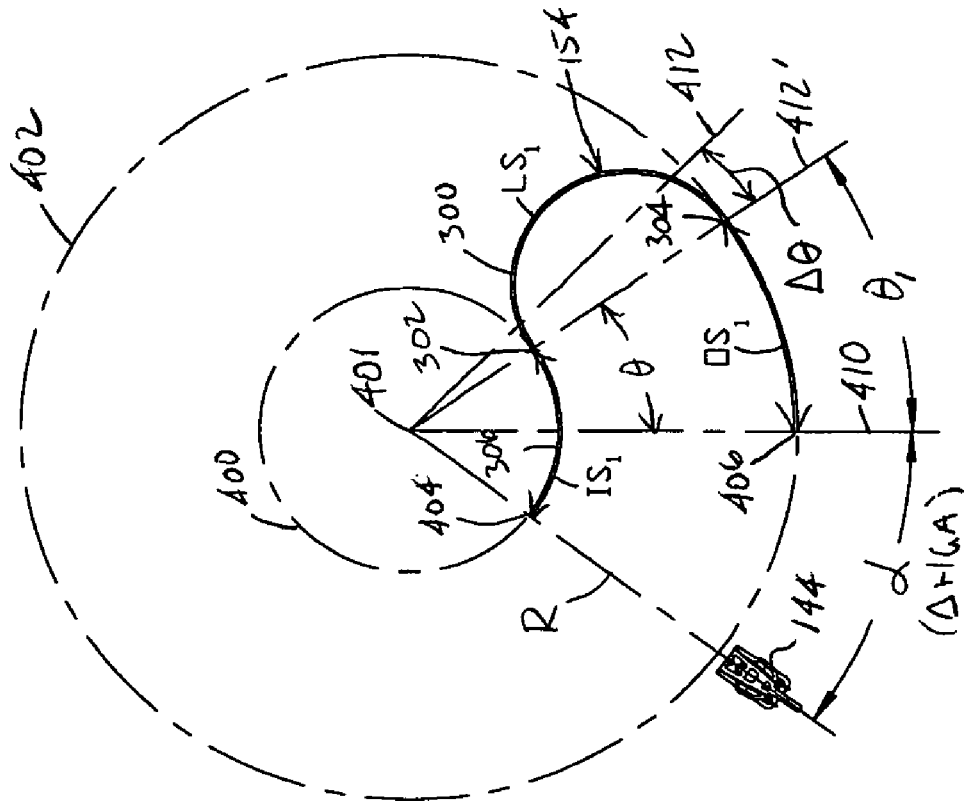
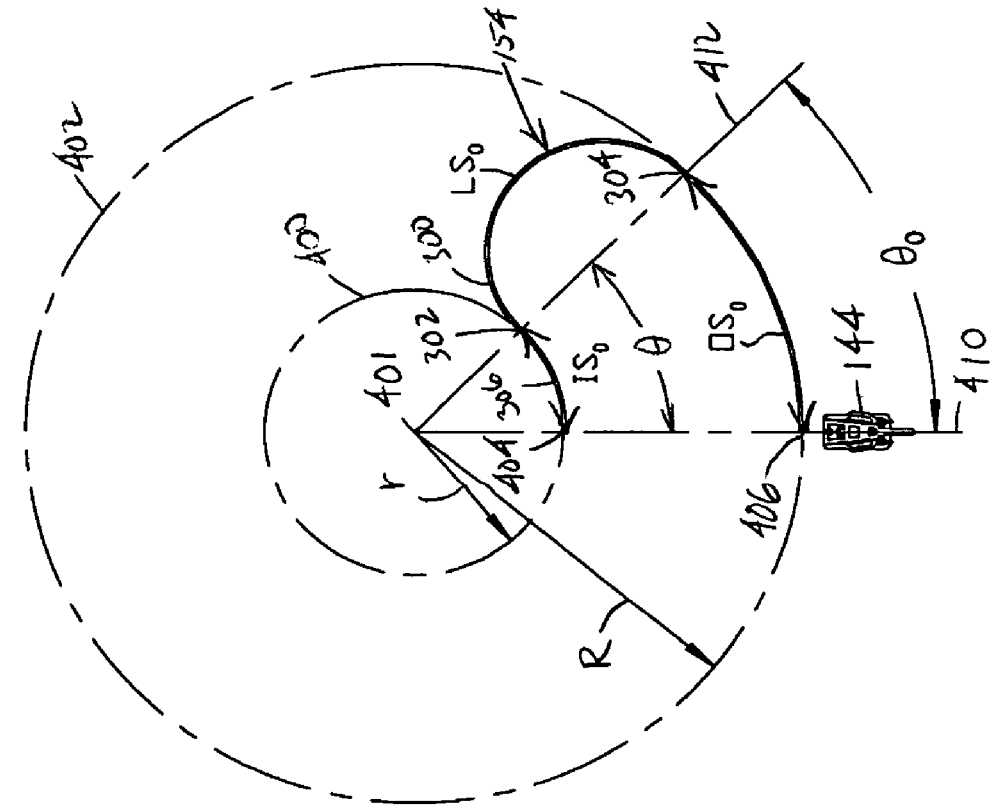
FIGURE 9b
FIGURE 9a

US 7,667,931 B1

FLEXIBLE ELECTRICAL INTERCONNECTION WITH ENDS URGED INTO ENGAGEMENT WITH CURVED SURFACES OF A SUPPORT AND HUB IN A MINIATURE HARD DISK DRIVE AND METHOD

BACKGROUND

There is an ever-increasing need for relatively large amounts of digital storage in portable devices. One approach in satisfying this need, that has been taken by the prior art, is through the use of a miniaturized hard disk drive. Unfortunately, however, it is submitted that many features used in some current miniaturized hard disk drives simply represent smaller versions of larger form factor counterparts, with somewhat limited substantive technological advancement.

One example, commonly seen in miniaturized hard disk drives, resides in the use of an S loop for purposes of electrically interfacing the actuator arm or head stack assembly of the drive. FIG. 1a is a diagrammatic, plan view illustrating a prior art hard disk drive, generally indicated by the reference number 10. Drive 10 includes a disk 12 that is supported for controlled rotation thereof, and an actuator assembly 14 having a Voice Coil Motor (VCM) end 16 and a transducer end 18. These components are supported within a housing 20. A flexible interconnection arrangement includes a flex cable connection or S loop 22 which bridges between a fixed mounting point within housing 20 and actuator assembly 14. It is noted that drive 10 is a "load-unload" type drive having a ramp outward of disk 12 for receiving actuator 14 in an unloaded position. Hence, actuator 14 is shown at an inside diameter (ID) and, in phantom, using dashed lines, at its unloaded position which is indicated by the reference number 14'. In this regard, S loop 22 changes shape and position responsive to pivotal movement of actuator assembly 14 and is shown using solid lines as it appears with actuator 14 at its ID position and is shown using dashed lines as it appears with actuator 14' at its unloaded position, indicated by the reference number 22'. Movement of S loop 22 between the ID and unloaded positions causes the flex cable to sweep across a swept area 26 that is indicated by hatching. It should be appreciated that swept area 26 represents a relatively large and elongated footprint in drive 10. Moreover, in a small form factor "thin" drive, no other components can generally be positioned above or below the swept area, since the drive is simply too thin to accommodate anything in swept area 26 other than the flex cable extension itself.

FIG. 1b is a diagrammatic, plan view illustrating another prior art hard disk drive, generally indicated by the reference number 40. Drive 40 includes like components with respect to drive 10 of FIG. 1a. Hence, like reference numbers have been applied and descriptions of like components will not be repeated for purposes of brevity. It should be appreciated, however, that swept area 26 again represents a significant footprint in drive 40. As is also the case with respect to drive 10, it is considered that the dimensional requirements of an S loop swept area are an impediment with respect to miniaturization.

A general concern with respect to a prior art S loop resides in the possibility that the loop can "toggle". That is, the curvature along the loop essentially reverses. In this event, interference concerns are likely. Efforts to reduce the overall size and swept area increase the concern with respect to toggling.

There are earlier approaches in the prior art which do not appear to require the use of an S loop. One example is seen in FIG. 1 of U.S. Pat. No. 4,853,800 (hereinafter, the '800 patent) which uses a linear actuator. Since there was little concern, at the time, with respect to form factor, it is believed that a very large swept area is required by the linear actuator configuration of the '800 patent. Another approach was taken in U.S. Pat. No. 5,375,021 (hereinafter, the '021 patent) wherein there again appears to be no particular concern with reduction of form factor. In the '021 patent, a free portion of the flex cable moves and is suspended between fixedly attached ends, one of which rotates with the actuator. Unfortunately, it is submitted that a large, elongated swept area is required when using this configuration.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

An apparatus and associated method are described for use in a disk drive which includes a disk supported for rotation. The apparatus includes a head stack assembly including first and second portions, at least generally opposing one another, with a hub therebetween at least for pivotally supporting the first portion using a pivot arrangement and the second portion is pivotally supported by the pivot arrangement for pivotal movement with the first portion and the first portion supports a VCM coil that is externally electrically interfaceable using a plurality of elongated VCM electrical conductors. The first portion supports a transducer configuration for performing a data operation using the disk. In one aspect of the present disclosure, the conductors extend to a connection position that is angularly separated from the VCM coil by an angular offset about the hub. The hub includes a side margin defining a channel for carrying the VCM electrical conductors at least partially around the angular offset such that the VCM electrical conductors are contained within an overall peripheral outline of the hub.

In another aspect of the present disclosure, a head stack assembly includes an overmolded portion which supports a VCM coil and forms a hub for pivotally supporting a VCM coil. The VCM coil is externally electrically interfaceable using a plurality of elongated VCM electrical conductors for extending to a connection position that is angularly separated from the VCM coil by an angular offset about the hub. The overmolded portion includes an overmolding thickness. The hub includes a side margin defining a channel for carrying the VCM electrical conductors at least partially around the angular offset such that the VCM electrical conductors extend completely within the overmolding thickness.

In still another aspect of the present disclosure, a head stack assembly includes first and second portions, at least generally opposing one another, with a hub therebetween at least for pivotally supporting the first portion using a pivot arrangement and the second portion is pivotally supported by the pivot arrangement for pivotal movement with the first portion and the first portion supports a VCM coil and the second portion supports a transducer arrangement for performing a data access using the disk. A flexible electrical interconnection arrangement includes a length that extends between a first end and a second end. The first end is attached for rotation with the head stack assembly and the second end is attached to a given position in the disk drive for use in making a plurality of external electrical connections for the transducer arrangement and the VCM coil. A first portion of the flexible electrical interconnection arrangement, proximate to the first end, biases against a side margin of the hub such that a rotation of the head stack assembly causes a length of the first portion to change over a given range of rotational movement of the head stack assembly.

In yet another aspect of the present disclosure, a head stack assembly includes first and second portions, at least generally opposing one another, with a hub therebetween for pivoting to provide for accessing a rotating disk. The first portion supports a VCM coil and the second portion supports a transducer arrangement for performing a data access using the disk. A flexible electrical interconnection arrangement includes a length that extends between a first end and a second end. The first end is attached to the head stack assembly for rotation with the hub such that a floating portion of the length rolls, responsive to pivotal movement of the hub, between the hub and a support surface, that is fixed with respect to pivotal movement of the head stack assembly and spaced away from the hub, and the second end is attached to a given position in the disk drive for use in making a plurality of external electrical connections with the transducer arrangement and the VCM coil. The floating portion of the length follows an at least generally semicircular path between a first contact position on the hub and a second contact position on the support surface such that a floating loop diameter is defined between the first contact position and the second contact position. The hub and the support surface are configured for changing the floating loop diameter responsive to pivotal movement of the head stack assembly so as to apply a resilient biasing torque to the head stack assembly which varies with the pivotal movement.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be illustrative rather than limiting.

FIGS. 9a-9c are diagrammatic plan views which illustrate the behavior of one embodiment of a rotating rolling loop that is used in the disk drive of FIG. 2.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiment shown, but is to be accorded the widest scope consistent with the principles and features described herein including modifications and equivalents, as defined within the scope of the appended claims. It is noted that the drawings are not to scale and are diagrammatic in nature in a way that is thought to best illustrate features of interest. Descriptive terminology such as, for example, upper/lower, right/left, front/rear top/bottom, underside and the like has been adopted for purposes of enhancing the reader's understanding, with respect to the various views provided in the figures, and is in no way intended as being limiting.

Figure 1A:
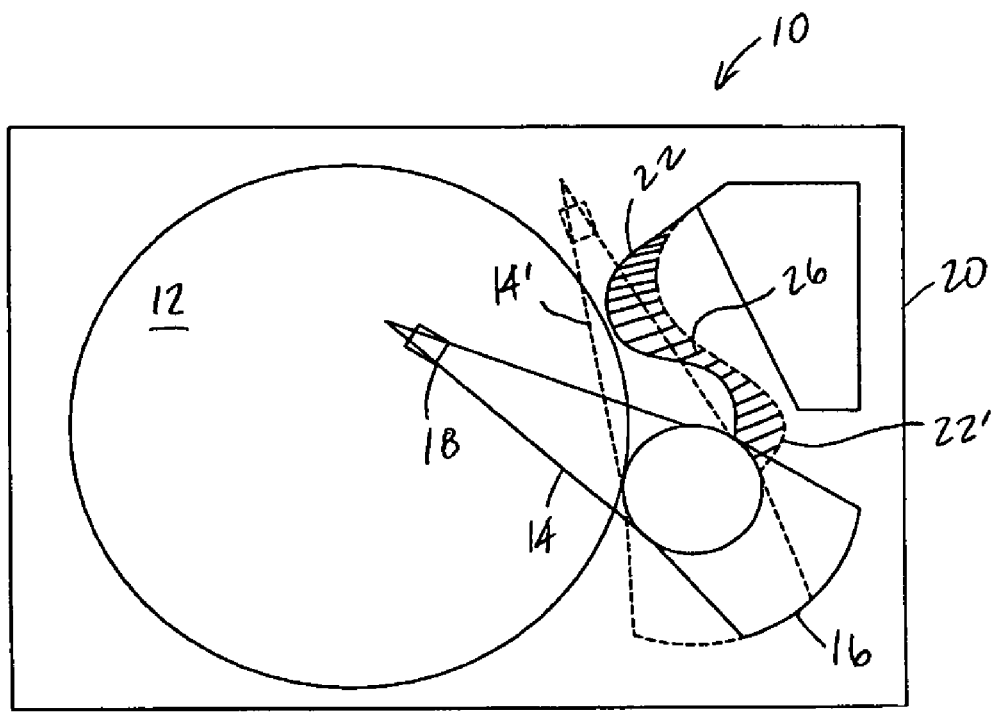
FIG. 1a is a diagrammatic illustration, in a plan view, of a prior art disk drive, shown here to illustrate one implementation of a prior art flexible cable S loop.
Figure 1B:
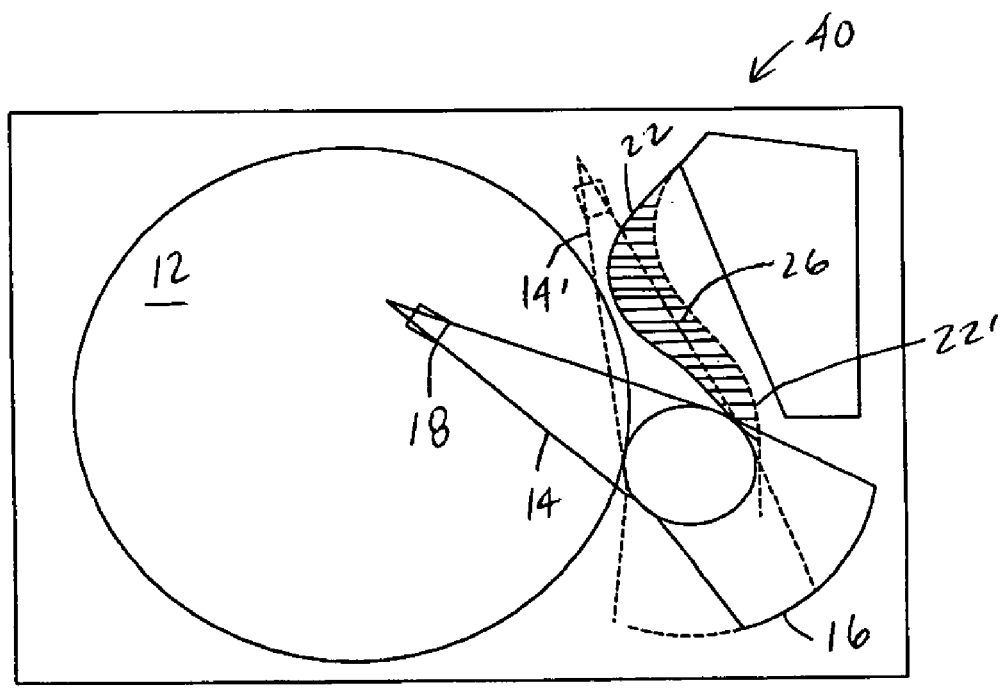
FIG. 1b is a diagrammatic illustration, in a plan view, of another prior art disk drive, shown here to illustrate another implementation of a prior art flexible cable S loop.
Figure 2:
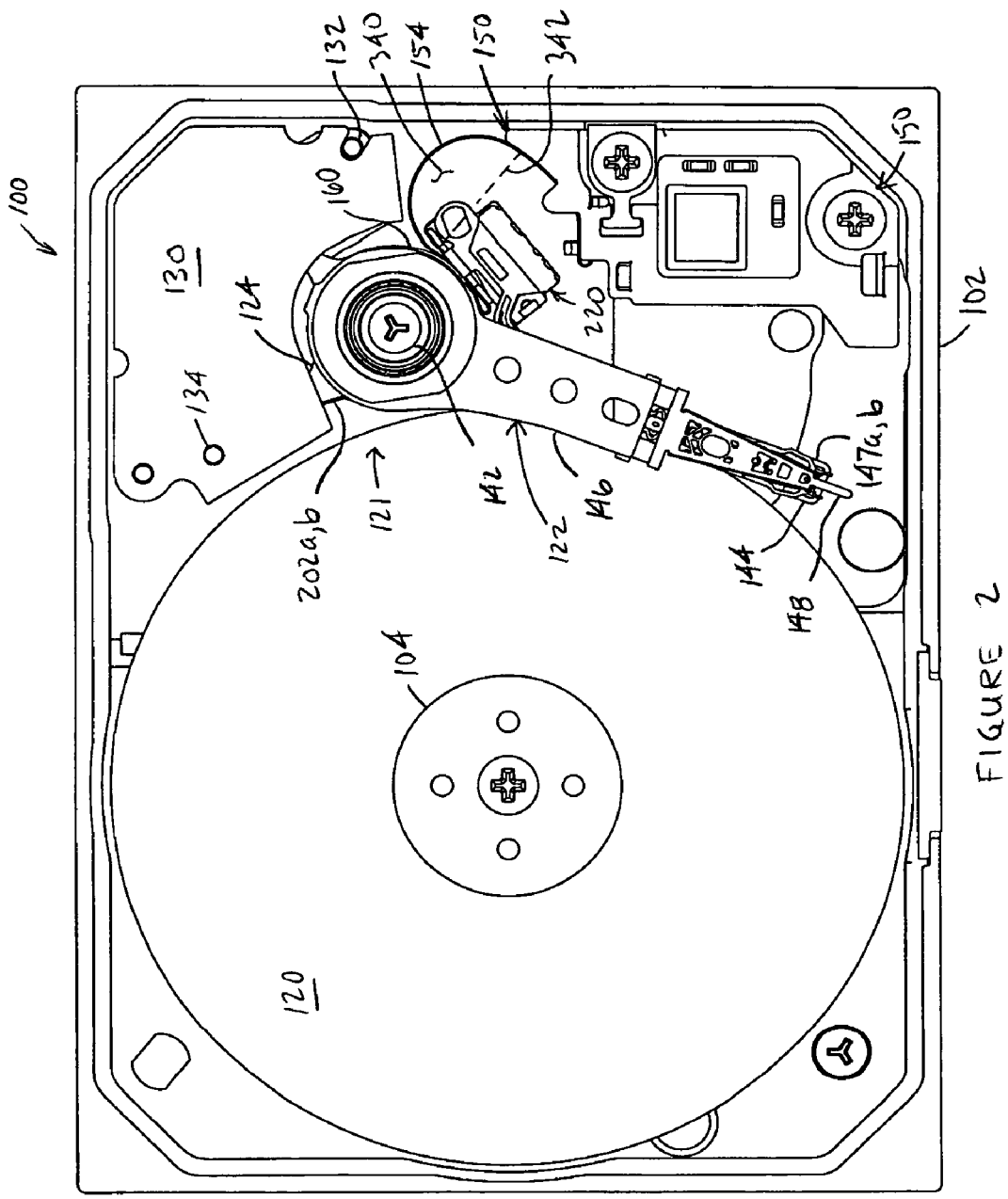
FIG. 2 is a diagrammatic illustration, in a plan view, of an exemplary embodiment of a disk drive, having its cover removed for purposes of illustrative clarity.

Turning now to the figures, wherein like components are designated by like reference numbers whenever practical, attention is immediately directed to FIG. 2 which diagrammatically illustrates a hard disk drive, produced in accordance with the present invention, and generally indicated by the reference number 100. While drive 100 is a miniaturized hard disk drive produced by Cornice, Inc., of Longmont, Colo., and the present invention is considered to be highly advantageous with respect to accomplishing miniaturization of hard disk drive 100, it is to be appreciated that the concepts taught herein are readily applicable with respect to any form factor disk drive. Further, these concepts are not limited to hard disk drives, but are at least generally applicable with respect to the use of a rotary actuator.

Still referring to FIG. 2, drive 100 has been illustrated with its cover removed in order to show the various components which make up the drive. Drive 100 includes a base 102, supporting a spindle motor 104 for use in rotating at least one disk 120. The latter includes opposing major upper and lower surfaces, each of which can be used to store digital data. A head stack assembly (HSA) that is generally indicated by the reference number 121, and which may be referred to hereinafter as an actuator arrangement, includes a head gimbal assembly 122 (HGA) and a VCM end 124 having a voice coil (not visible) that is supported in a magnetic field defined by an assembly that includes a magnet (not visible), a lower return plate (not visible) and an upper return plate 130, all of which will be familiar to those having ordinary skill in the art. It should be appreciated that the teachings herein apply to the use of any suitable number of disks/data surfaces and appropriately configured transducer arrangements. An inner diameter stop pin 132 and an outer diameter stop pin 134 serve to define rotational extents of travel of the HSA by engaging side margins of VCM end 124 at an inner diameter position and an outer diameter position, respectively, and further serve in conducting magnetic flux between the upper and lower return plates. Thus, the voice coil is supported in a magnetic field such that a controlled electric current in the voice coil can be used to selectively change the position of HGA 122. In this regard, the HSA is pivotally supported at a pivot 142. HGA 122, which may be referred to as a transducer arm arrangement extends, outward from pivot 142, at least generally opposite VCM end 124, to a transducer arrangement 144. In the present example, a pair of transducer arms 146 is used such that a first transducer configuration 147a, associated with an upper one of the arms, performs data accesses using an upper surface (visible in FIG. 2) of disk 120, while a second transducer configuration 147b, associated with a lower one of the arms, performs data accesses using a lower surface (not visible in FIG. 2) of disk 120. Generally, each transducer configuration comprises a slider which may support separate read and write transducers in a well known manner. A lift tab 148 extends from the distal end of each of the transducer arms.

With continuing reference to FIG. 2, a flexible circuit assembly 150 supports a number of integrated circuits and further includes flex extensions for interconnecting the various electrical components within drive 100, as well as for use in externally electrically interfacing the hard disk drive. Since the general aspects and use of a flexible circuit assembly are well-known, such descriptions have not been provided for purposes of brevity. One example of the aforementioned flex extensions comprises an HGA flexible circuit extension 154 which may also be referred to interchangeably as a "flex loop" or "flexible circuit extension." A latching arrangement, which is not visible, due to the presence of upper return plate 130, can be positioned proximate to VCM end 124 of HSA 121 for use in limiting the potential of the HGA with respect to rotating from an unloaded position to a loaded position in which the transducer configurations or sliders of transducer arrangement 144 come into contact with the data surfaces of disk 120 at an undesired time such as, for example, when the disk is not rotating. It is noted that any suitable latch arrangement may be used, however, one suitable latching arrangement is described in U.S. Pat. No. 5,404,257 which describes an inertial latch configuration.

A ramp arrangement can be used for receiving lift tabs 148 in a manner which will be familiar to one having ordinary skill in the art. The ramp arrangement has not been shown for purposes of illustrative clarity. It is noted that any suitable ramp arrangement can be used. Such a ramp arrangement defines an opposing pair of surfaces for engaging the lift tabs to support the transducer arrangement in an unloaded position such that the transducer configurations are remotely located with respect to the disk surfaces.

Figure 3:
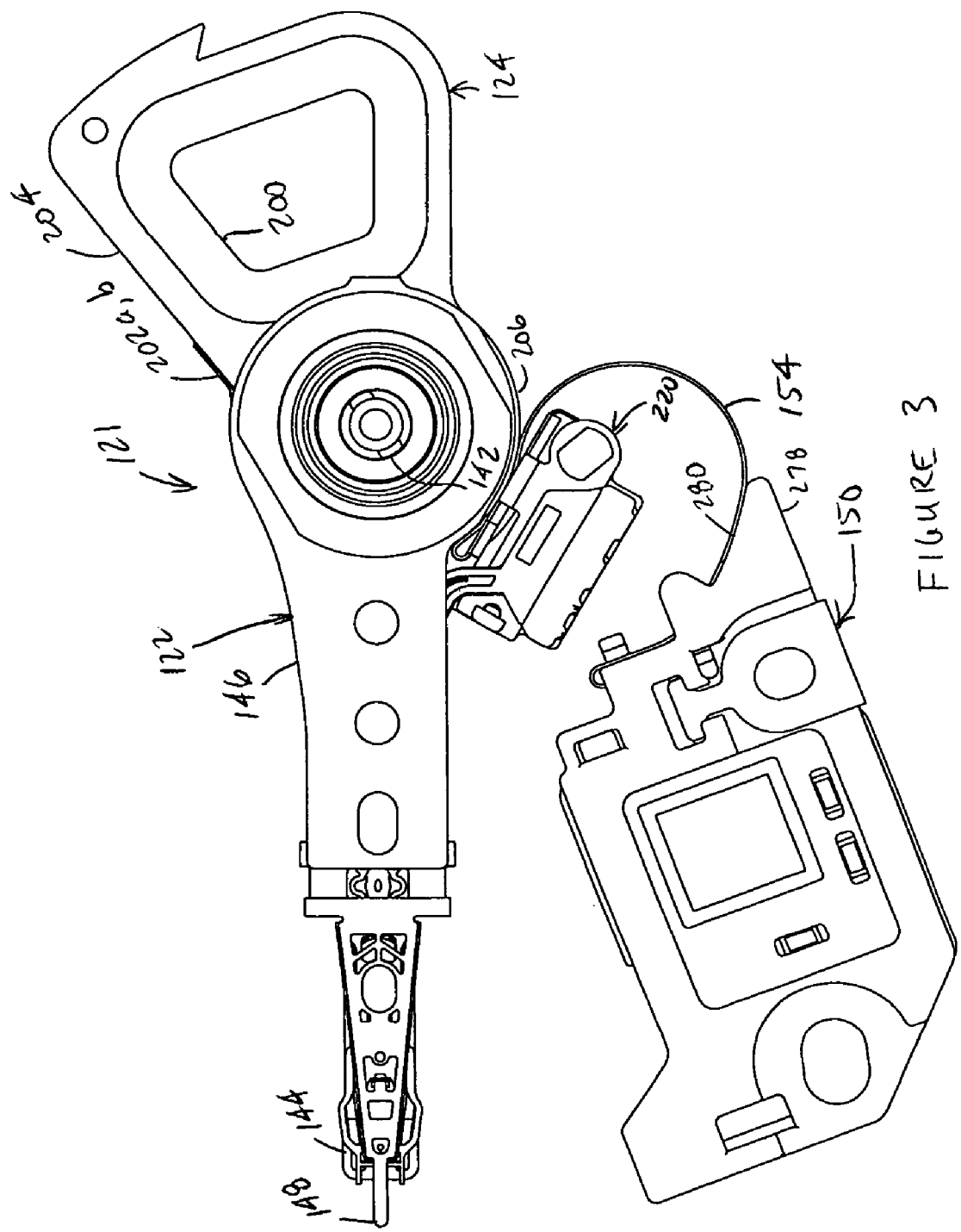
FIG. 3 is a diagrammatic plan view showing a head stack assembly and flexible circuit assembly of the disk drive of FIG. 2.
Figure 4:
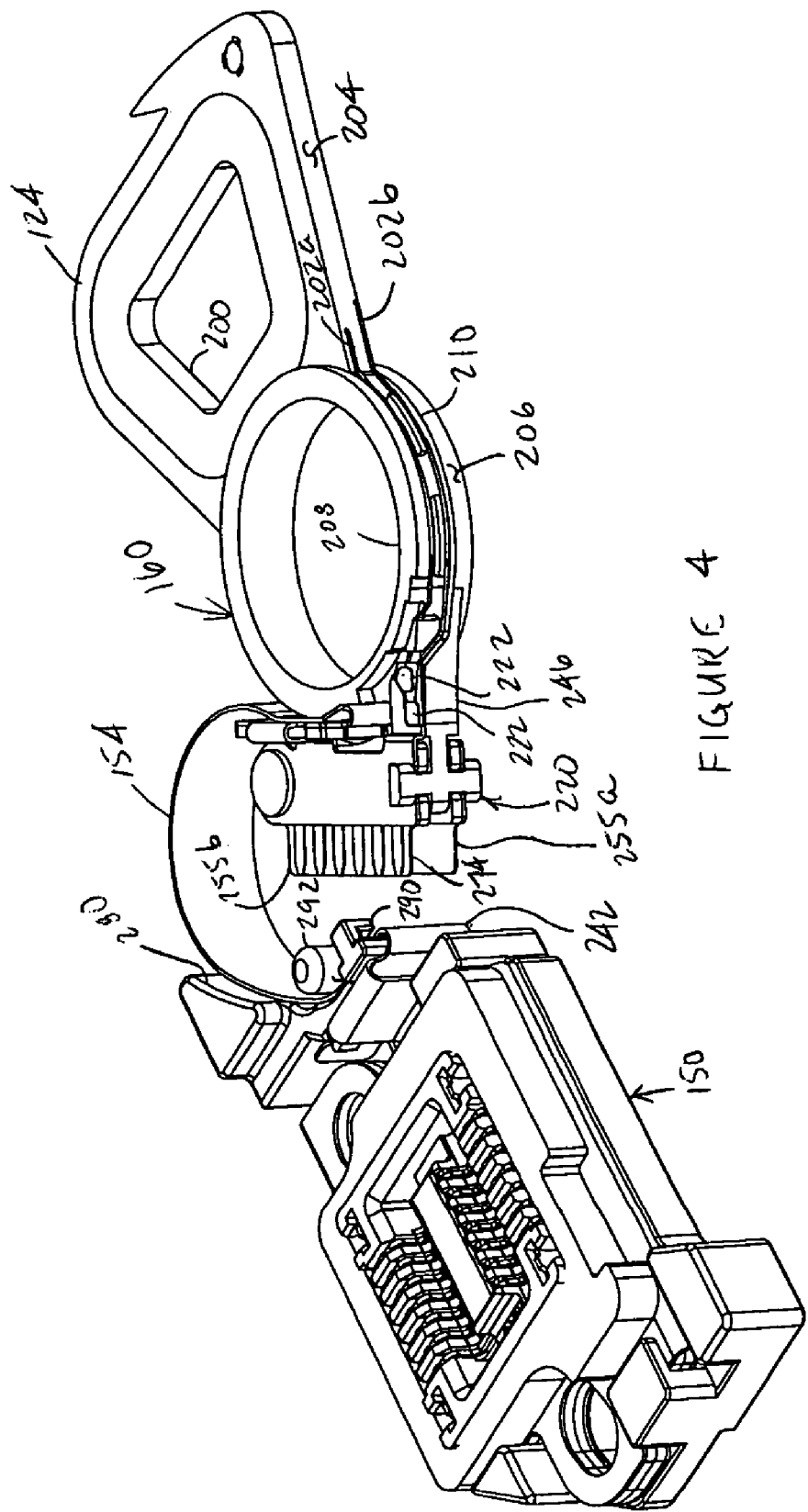
FIG. 4 is a diagrammatic view, in perspective, showing a hub that electrically connects to a flexible circuit assembly using a flexible circuit extension, shown here to illustrate one embodiment for providing electrical interconnections of the various components.
Figure 5:
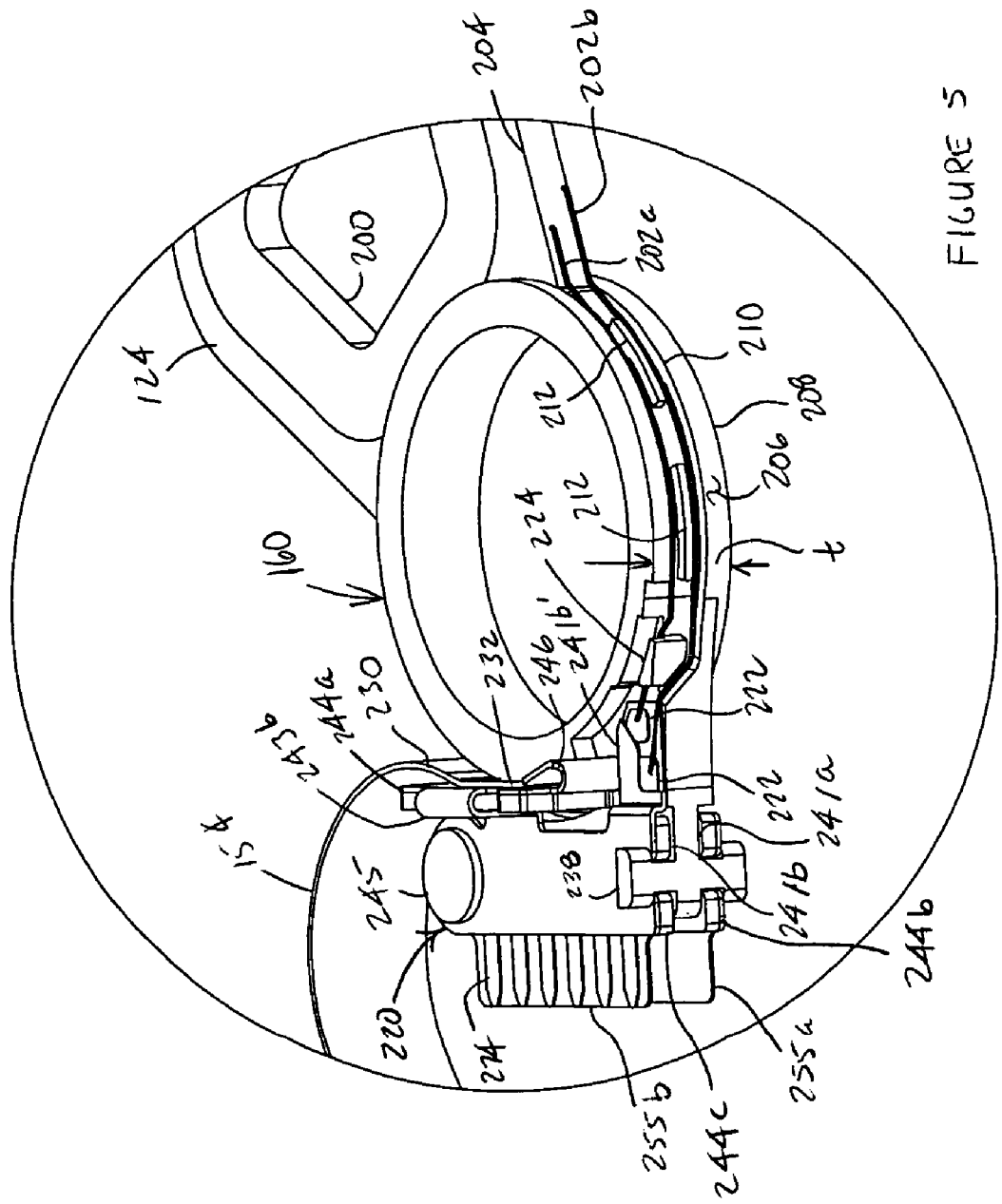
FIG. 5 is a further enlarged view of the hub of FIG. 4, shown here to illustrate further details with respect to its structure.

Turning now to FIGS. 3-5, attention is directed to further details with respect to the structure of HSA 121 and flexible circuit assembly 150. FIG. 3 illustrates HSA 121 and flexible circuit assembly 150, in a plan view, separate from the overall hard disk drive and further enlarged for purposes of illustrating certain features. FIG. 4 is a perspective view of a hub 160 which can be overmolded to support a voice coil 200, and also showing flexible circuit assembly 150, while FIG. 5 is a cut away, further enlarged perspective view of hub 160, taken to show the hub from its underside and which is shown for purposes of illustrating features that are provided within a sidewall of the hub. Hub 160 can be formed in any suitable manner and from any suitable material. In another embodiment, the hub could be formed by machining. It is noted that overmolding to support a VCM coil will be familiar to those having ordinary skill in the art. In the present example, a pair of VCM electrical leads 202a and 202b emerge from a side margin 204 of the overmolded material and are routed to a hub sidewall 206 of a ring portion 208 of the hub. It is noted that hub sidewall 206, in this example, comprises a cylindrical surface of rotation about the pivot center of HSA 121, however, any other suitable shape may be used insofar as the side-to-side and (z-direction) vertical profile of the hub sidewall, as will be further described at an appropriate point below. The VCM electrical leads may be referred to collectively using the reference number 202. Sidewall 206 is molded so as to define a wire routing channel 210 (best seen in FIG. 5) that is recessed into the sidewall. Within the wire routing channel, spacer blocks 212 are integrally formed so as to maintain VCM electrical leads 202 in a spaced apart relationship. Thus, the VCM electrical leads are routed around an angular portion of sidewall 206. It should be appreciated that leads 202 can be dressed into wire routing channel 210 immediately subsequent to the molding process. In this regard, the VCM electrical leads are substantially protected against flexing and from inadvertent contact during subsequent assembly procedures. Such protection is significant, since these leads can be quite fragile, particularly in a small form factor drive.

Still referring to FIGS. 3-5, channel 210 runs to an HGA connection assembly (HGACA) 220, a portion of which can be integrally formed with hub 160, as will be seen. The VCM electrical leads transit from channel 210 to a pair of electrical connection pads 222 that are supported on a surface which is transverse to sidewall 206. In making this transition, end portions of VCM leads 202 are separated from one another using a spacer block 224 which can increase the separation between the VCM electrical leads, since the distal ends of these leads are not covered by electrical insulation. This arrangement is useful, for example, when the specific length of the uninsulated portion may be subject to a significant tolerance, for instance, as a result of the specific manufacturing process that is used to remove the insulation from the distal ends. VCM electrical leads 202 may be electrically attached to pads 222 in any suitable manner such as, for example, by soldering. It should be appreciated that VCM electrical conductor leads 202 emerge from VCM end 124 and are routed to connection pads 222 entirely within a thickness "t" (shown in FIG. 5) of hub 160 in the z dimension. One conventional approach, in attempting to make the electrical connections to the VCM coil, might be to use an additional flexible circuit extension supported by ring portion 208 of hub 160 to electrically connect the VCM coil. While this may be practical in a larger form factor drive, the scale at which drive 100 is designed causes the width of a flex extension with two traces to be greater than thickness t of ring portion 208. Further, adhering a flex extension to an upper or lower surface of ring portion 208 could result in additional z height of the drive. Thus, the implementation of the VCM electrical connection of FIGS. 3-5 is considered to be useful with respect to minimizing drive height, in conjunction with providing protection for the somewhat fragile VCM leads.

Still considering the VCM electrical connection implementation described immediately above and referring to FIG. 2, the side of hub 160 that carries VCM leads 202 is immediately adjacent to disk 120. By essentially recessing the VCM leads into the overall outline of hub 160, the leads are protected against contact with the disk. Conventional surface mounting of the leads on the hub sidewall does not afford such protection and any out-of-tolerance condition could result in rubbing contact of one or both of the VCM leads with disk 120. It is worthwhile to note that hub 160 readily accommodates channel 210 within its overall peripheral outline, without requiring a compensational change in the peripheral outline. Thus, the use of this VCM lead routing approach not only provides an advantage with respect to z height reduction, but additionally saves lateral, or what is commonly referred to as x-y space within the form factor of the drive. That is, the x-y space is in the plane of FIG. 2. In this regard, it is generally accepted practice to refer to dimensions normal to the plane of this figure, i.e., with reference to features relating to the thickness of a disk drive or normal to its x-y space, as residing along a z axis.

Figure 6A:
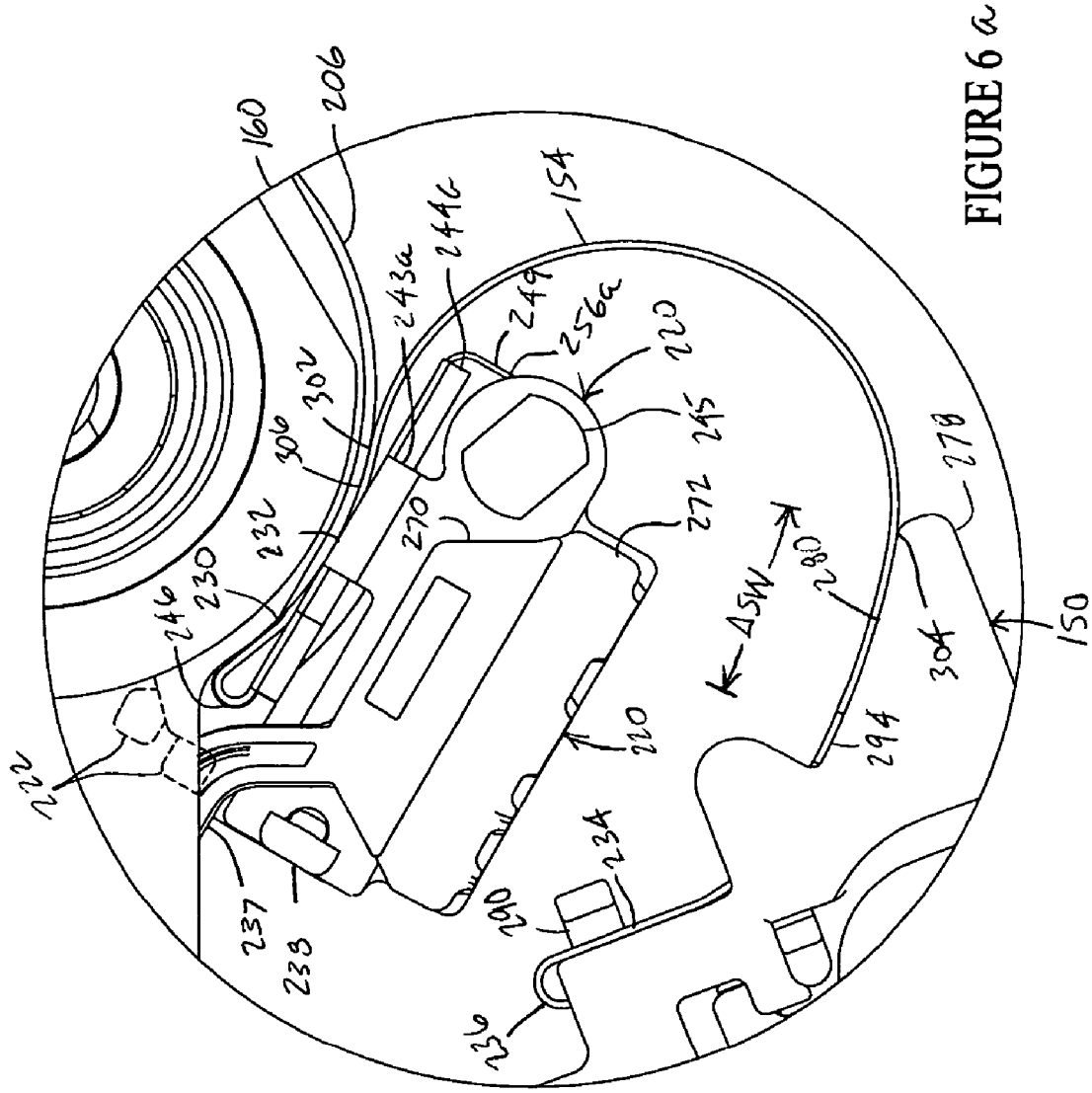
FIG. 6a is a still further enlarged view of a portion of the enlarged view of FIG. 3, which illustrates details with respect to a rotating rolling loop configuration that is used to electrically interconnect the head stack assembly to the flexible circuit assembly, along with other illustrated features.

Referring to FIG. 6a, a further enlarged plan view is provided which shows portions of hub 160 and flexible circuit assembly 150, along with HGA connection assembly 220. Flexible circuit extension 154 includes a first end 230 that is captured between sidewall 206 of ring portion 208 and HGACA 220 at a first location 232, as will be described in further detail below, and a second end 234 that is captured or received by a bracket, yet to be described, which forms part of flexible circuit assembly 150 proximate to a bend 236.

Figure 6C:
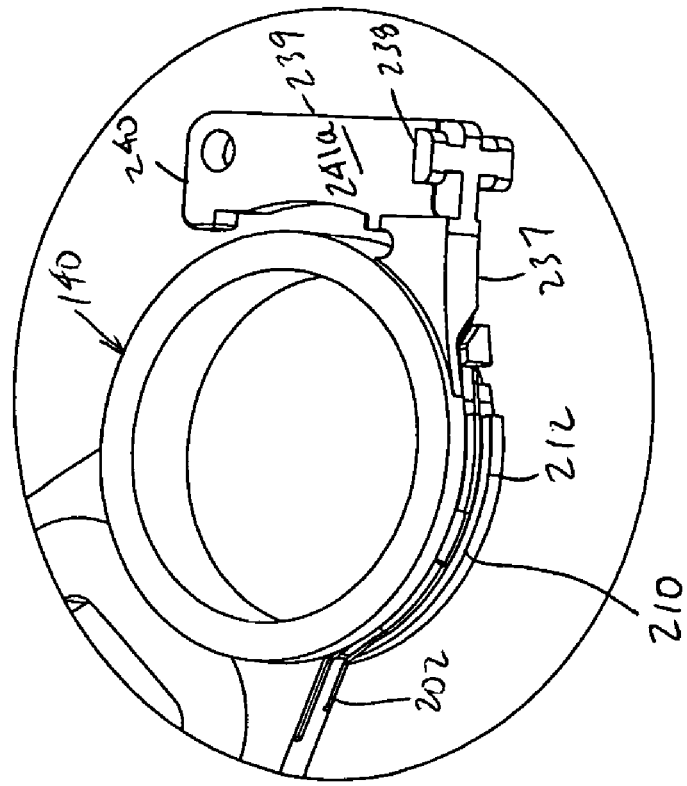
FIG. 6c is a perspective view which illustrates further details of the structure of the hub of FIG. 6b.
Figure 6B:
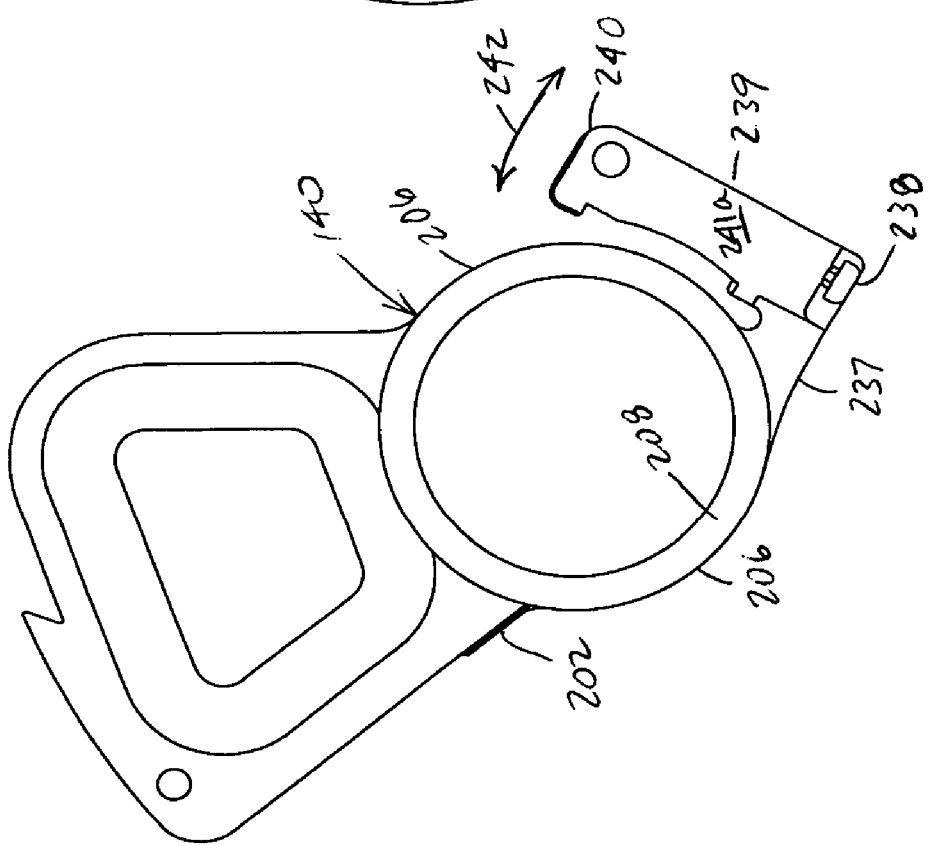
FIG. 6b is a plan view which illustrates further details of the structure of a hub.

Referring to FIGS. 6b and 6c, in conjunction with FIG. 6a, FIGS. 6b and 6c illustrate a support arm 237 that is integrally formed with and extends from ring portion 208 of hub 160 to a support member having a near end which defines a T-post 238 and a body 239 that extends to a remote end 240. Body 239 further defines opposing upper and lower support surfaces 241a and 241b (only the former is visible). In this regard, it is noted that there is no requirement to integrally form ring 208, arm 237 and body 239 and any suitable configuration may be employed. It should be appreciated that body 239 is supported for resilient movement at least as indicated by an arrow 242 in FIG. 6b. It is noted that VCM leads 202 can be seen in FIGS. 6b and 6c and channel 210 can be seen in FIG. 6c.

Figure 6D:
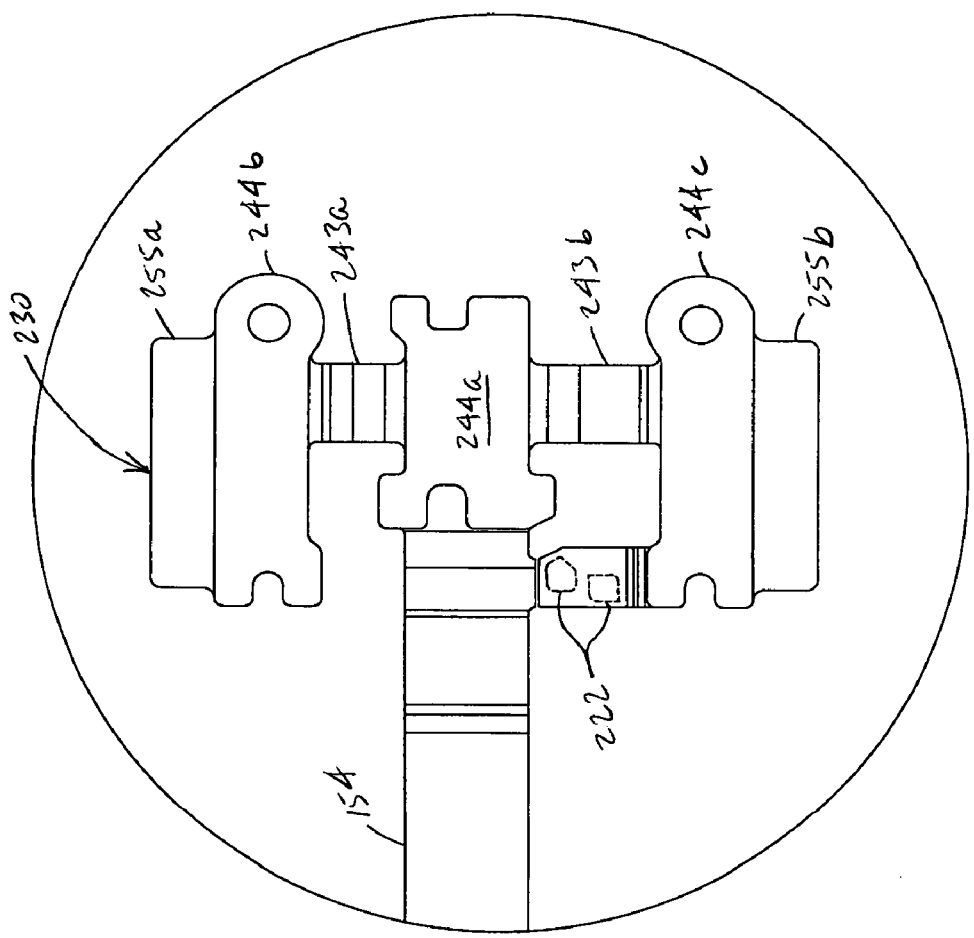
FIG. 6d is a plan view which illustrates details of the flexible extension for use in connecting to the head stack assembly using the hub of FIGS. 6b and 6c.

Referring primarily to FIG. 6d, first end portion 230 of flex extension 154 is shown in a diagrammatic plan view. In particular, at this end portion, flex extension 154 splits into an upper branch 243a (FIG. 6a) and a lower branch 243b (FIG. 5) for serving the upper and lower transducer arms, respectively. A set of flex supports is used to support various parts of end portion 230 including a branching support 244a, an upper branch support 244b and a lower branch support 244c, as will be further described and which may be referred to collectively as flex supports 244. The latter may be attached to the flex end portion in any suitable manner including, for example, using appropriate adhesives.

Referring to FIGS. 5 and 6a, end portion 230, including flex supports 244, is shown as installed. In particular, upper branch 243a and lower branch 243b are routed around branching support 244a such that upper branch support 244b and lower branch support 244c are positionable on support surfaces 241a and 241b, respectively. Upper branch 243a is supported against an outer surface of upper branch support 244b and lower branch 243b is supported against an outer surface of lower branch support 244c. As mentioned above, with respect to FIG. 6d, the upper and lower branches of the flex extension may be adhesively attached to the upper and lower branch supports. Further, the upper and lower branch supports, along with the upper and lower flex branches, are captured on their respective support surfaces using T-post 238 and a pin 245. At the same time, flex extension 154 is bent back upon itself to form a loop 246 with branching support 244a and the associated flex extension resiliently captured between body 239 and hub sidewall 206. No glue or other fastening expedient is needed for purposes of holding HGA flex extension 154 at its HGA end, although other implementations may provide for additional measures to hold the HGA end in place.

Referring primarily to FIG. 5, an end portion 255a of upper flex branch 243a overhangs body 239. Similarly, an end portion 255b of lower branch 243b also overhangs body 239. Free end portions 255a and 255b of the upper and lower branches are used for electrically connecting flex extension 154 to the first and second transducer configurations 147a and 147b (FIG. 2) of the upper and lower transducer arms, as yet to be described. Further, connection pads 222 (FIG. 5) are formed by lower branch 243b on a support surface 241b'. It is noted that pads 222 are shown in phantom in FIG. 6d and are formed on a tab of lower flex branch 243b.

Figure 7:
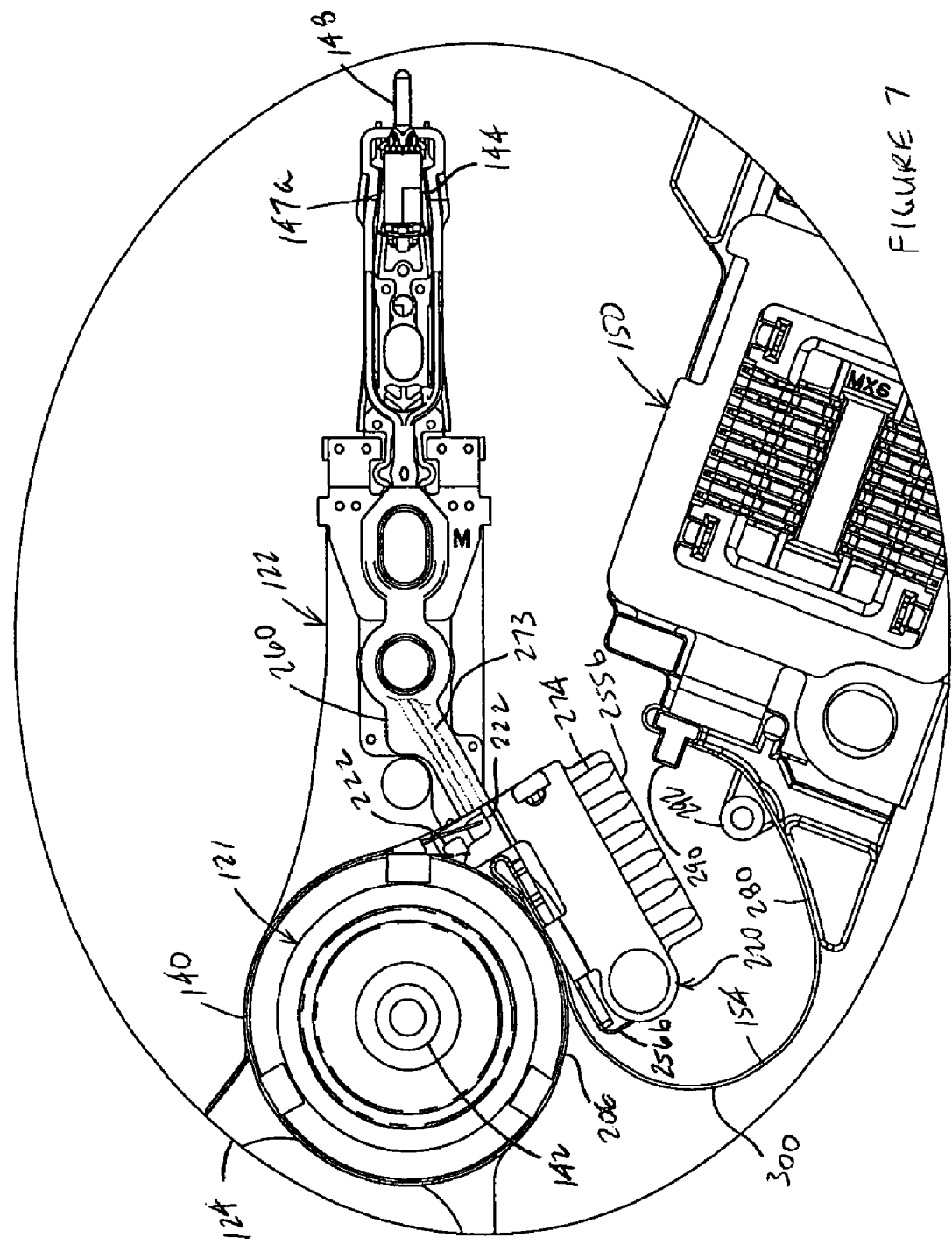
FIG. 7 is a plan view showing an underside of the head stack assembly of FIG. 3 along with a portion of the flexible circuit assembly, having a lower transducer arm removed in order to illustrate additional details that are visible.

Turning now to FIG. 7 in conjunction with FIGS. 4-5, the former is a partially cut-away, bottom or underside plan view, illustrating a portion of HGA 122 and a portion of flexible circuit assembly 150 with the lowermost transducer arm removed, in order to reveal details with respect to the underside of the upper transducer arm. In this regard, a Circuit Integrated Suspension (CIS) 260 is provided with each transducer arm so as to extend along a length of the transducer arm to electrically interconnect transducer configurations 147a and 147b (only transducer configuration 147a is visible in the view of FIG. 7) to HGA connection assembly 220. It should be appreciated that the use of a CIS, as shown, supported on the transducer arm, will be familiar to one having ordinary skill. Moreover, any suitable alternative to a CIS may be used.

For purposes of clarity, it is noted that FIGS. 6a and 7 illustrate a partial assembly after having completed electrical interconnections between transducer configuration 147a and flexible circuit extension 154, using CIS 260, for the upper transducer arm, while FIGS. 4 and 5 illustrate a partial assembly that does not include the transducer arms (i.e., HGA 122) or CIS supported thereon.

Referring to FIG. 6a, a CIS end portion 270 is routed onto support surface 241a (see FIG. 6b) such that a free end 272 (see FIG. 6a) overhangs the support area. It should be appreciated that CIS electrically conductive traces 273 (partially shown in FIG. 7), at free end 272, are in a confronting relationship with corresponding traces 274 (see FIGS. 4, 5 and 7) of unsupported end 255a of upper branch 243a of flexible circuit extension 154. The confronting traces of free end 272 and unsupported end 255a can be electrically bonded to one another in any suitable way. In the present example, an anisotropic conductive film (ACF) is used which essentially serves to form electrical connections when pressure and heat are applied to bias these overhanging and confronting portions together. It should be appreciated that the CIS for the lower transducer arm is similarly arranged and, therefore, will not be described for purposes of brevity. It should be understood that other details may not be repeated where the structure associated with one of the transducer arms is essentially duplicated with respect to the other one of the transducer arms.

Figure 8:
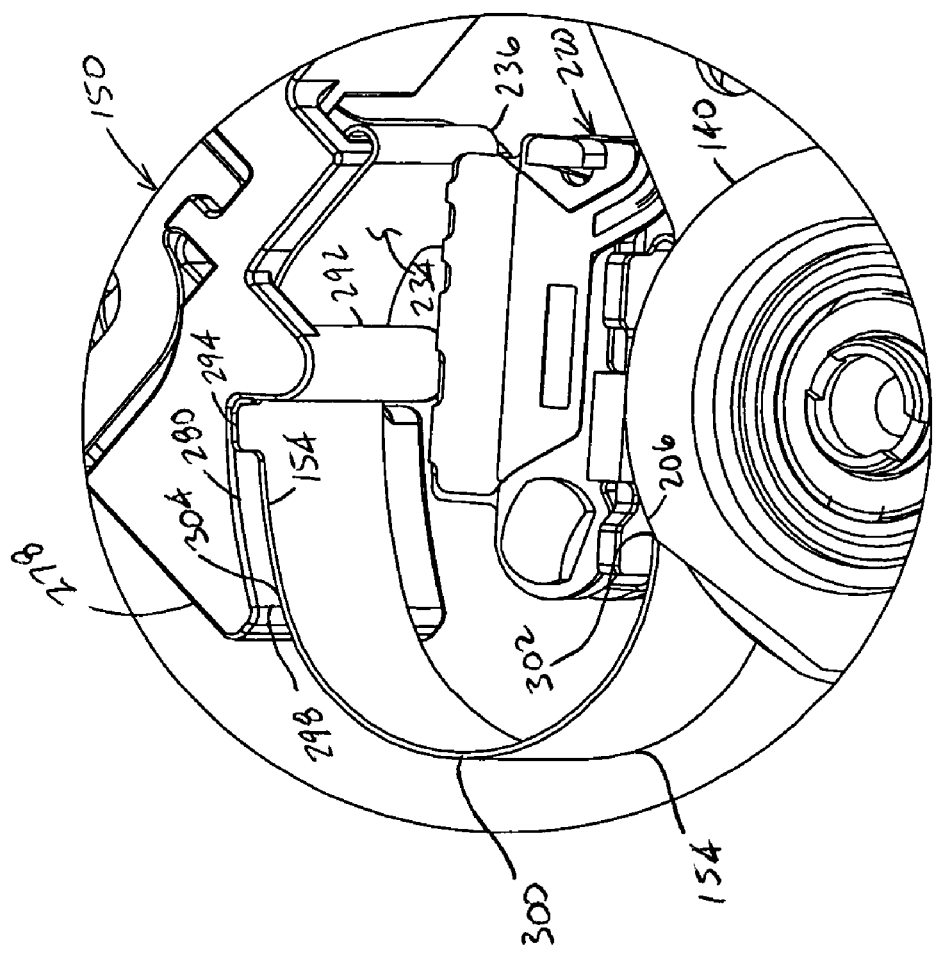
FIG. 8 is a perspective view that is provided primarily for purposes of illustrating one embodiment for supporting the flexible extension at the flexible circuit assembly.

Referring to FIG. 8 in conjunction with FIGS. 6a and 7, the former is an enlarged cut-away view, in perspective, illustrating a portion of flexible circuit assembly 150, HGA connection assembly 220 and a portion of hub 160. Flexible circuit assembly 150 includes a support bracket 278 so as to define a support wall 280 that is concentric with sidewall 206 of hub 160 in the form of a cylindrical, confronting surface of rotation, although the sidewall may have any suitable vertical profile, such as, for example, concave. Second end 234 of the flexible circuit extension is formed and biased in a way which generally maintains its position during normal operation. A number of features, however, are provided primarily for purposes of initial installation, but which may restrain movement at times during operation. These features include a hook 290 (FIG. 7), a retaining post 292, both supported by bracket 278, and a tab 294 that forms part of the flexible circuit extension. Hook 290 and retaining post 292 generally limit lateral movement of flexible circuit second end 234 away from support wall 280, while tab 294 serves to limit lengthwise movement, that would effectively reduce the overall length of the flexible circuit extension, by engaging a sidewall of bracket 278 above retaining post 292, in the view of FIG. 8. Flexible circuit extension 154 further includes a free or floating portion 300 that arcuately extends and is captured between first and second opposing contact or tangent locations 302 and 304 on hub sidewall 206 and support wall 280, respectively. It should be appreciated that these tangent locations move along the surfaces that they engage, with rotation of the HSA. As will be seen, pivotal rotation of the HSA serves to take up and feed out a portion 306 (FIG. 6a) of flexible circuit extension 154 that is biased against hub sidewall 206. In this regard, sidewall 206 can have any appropriate shape in the z direction. As examples, the sidewall can be flat or concave where portion 306 rolls against it.

Attention is now directed to FIGS. 9a and 9b which diagrammatically illustrate the dynamic and functional behavior of flexible circuit extension 154 with pivotal rotation of the HSA in moving transducer arrangement 144 from an unloaded or parked position, illustrated in FIG. 9a, to an inner diameter position, illustrated in FIG. 9b. Thus, the transducer arrangement is moved over a total angular range that is designated as ΔHGA, shown in FIG. 9b. An inner circle 400 having a radius r, from a pivot center 401 of the HGA, represents a concentric hub surface 206 (FIG. 6a) while a concentric, outer circle 402 having a radius R, from pivot center 401, represents support wall 280. First attachment point 404 and second attachment point 406 represent the fixed end connections of flexible circuit extension 154 at inner circle 400 and outer circle 402, respectively. Thus, first attachment point 404 (see also location 232 in FIG. 6a) rotates with the HGA, while second attachment point 406 remains fixed, as can be appreciated by comparing FIGS. 9a and 9b.

Further annotations used in FIGS. 9a and 9b include:

IS=Length of flex extension that is biased against inner circle 400 (i.e., hub surface 206) between first attachment point 404 and tangent location 302, which also correspond to item 306 in FIG. 6a, OS=Length of flex extension that is biased against outer circle 402 (between second attachment point 406 and tangent location 304), LS=Length of unsupported or "floating flex" loop 300 (a constant value), θ=Current angle measured from a reference axis 410 to centerline 412 (i.e., diameter) of floating section 300 of the flexible circuit extension, and α=Current angular position (or "sweep angle") of the HGA and transducer arrangement 144 from reference axis 410

(FIG. 9b). Note that α is equal to ΔHGA when transducer configuration 144 is at the disk inner diameter, as in FIG. 9b, while α is equal to zero in FIG. 9a, corresponding to an unloaded, parked position. Moreover, it should be appreciated that the location of the reference axis can be selected arbitrarily. Further, the illustrated relationship, showing the transducer configuration residing along the same radial line as attachment point 404 is not required, but was selected for purposes of enhancing the reader's understanding.

It is noted that a "0" subscript, appended to any of these values, refers to a parked or unloaded position beyond the outer diameter of disk 120, shown in FIG. 9a and a "1" subscript appended to any of these values refers to the inner diameter HGA position illustrated by FIG. 9b. For example, $θ_1$ is the angle of the diameter of the floating section from reference axis 410 with the transducer arrangement at its inner diameter, while angle $θ_0$ of the floating portion is the angle of the diameter of the floating section from reference axis 410 with the transducer arrangement at an unloaded or parked position.

A number of assumptions have been made for purposes of characterizing the behavior of this rotating rolling loop configuration. In particular, R and r are concentric circles of constant radius, and floating portion 300 forms a semicircular 180° arc between tangent locations 302 and 304. At least to a reasonable approximation, these conditions have been found to correspond to the general behavior of the rotating rolling loop in drive 100.

Accordingly, the following conditions are known:

$$LS_0 = LS_1 \quad (1)$$

$$IS_0 + LS_0 + OS_0 = IS_1 + LS_1 + OS_1 \quad (2)$$

Substituting Equation (1) into Equation (2), the following expression is obtained:

$$IS_0 + OS_0 = IS_1 + OS_1, \quad (3)$$

Further relationships based on FIG. 9a include:

$$IS_0 = rθ_0, \text{ and} \quad (4)$$

$$OS_0 = Rθ_0 \quad (5)$$

Further relationships based on FIG. 9b include:

$$IS_1 = rθ_1 + rβ, \text{ and} \quad (6)$$

$$OS_1 = Rθ_1 \quad (7)$$

Combining all of the foregoing expressions yields the expression:

$$θ = \frac{θ_0(r+R) - rα}{(r+R)} \quad (8)$$

Providing the angular position of the diameter of floating portion 300 for a given HGA sweep angle.

Figure 9C:
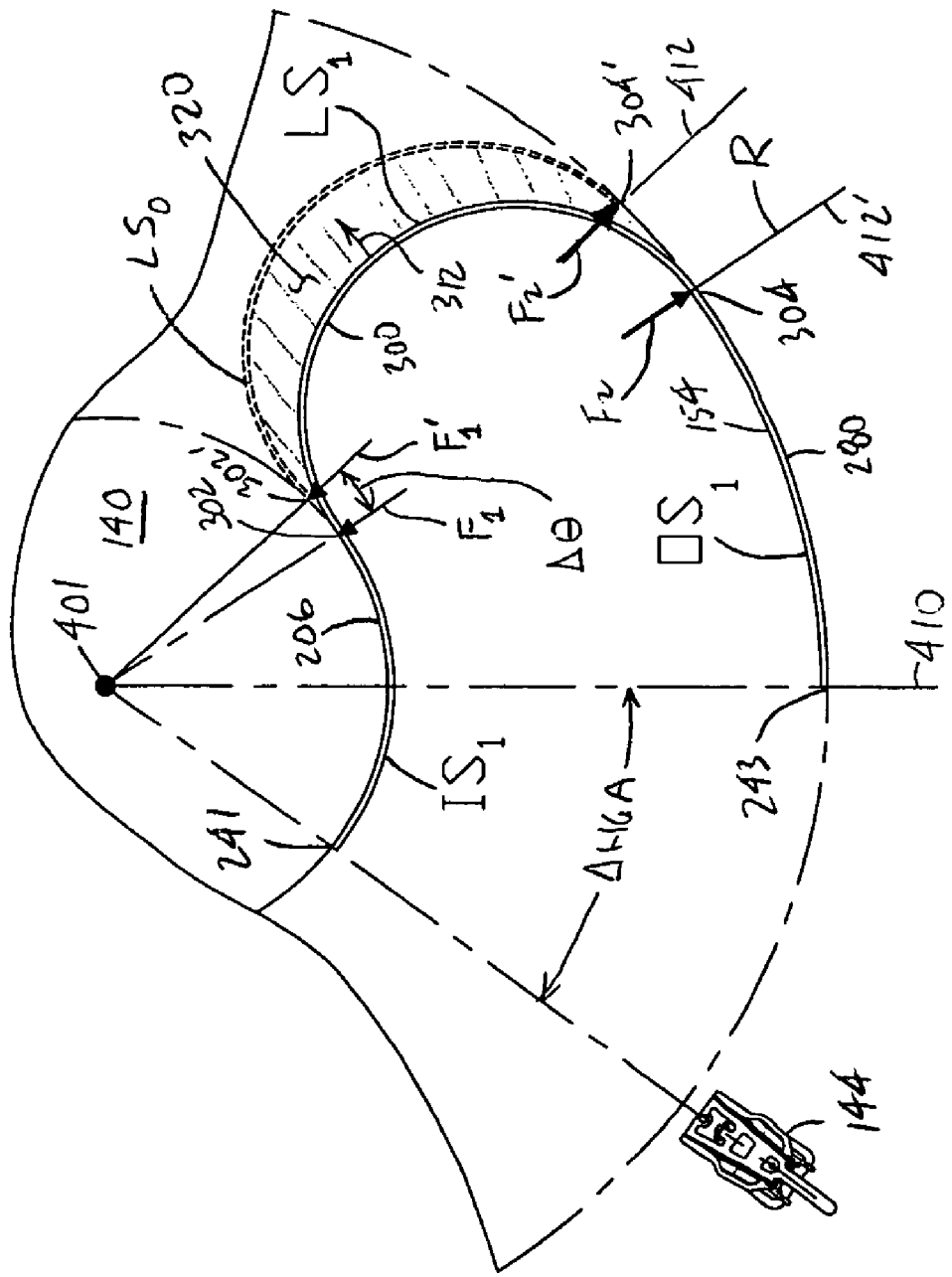

Referring now to FIG. 9c, an enlarged cut-away view of a portion of FIG. 9b is presented for purposes of supporting a discussion with respect to details of the operation of the rotating rolling loop. Initially, it should be mentioned that flexible circuit extension 154 is essentially captured between two concentric arc surfaces to form floating section 300. The tendency of floating section 300 of the flexible circuit extension is to straighten out in order to achieve its lowest energy state. The loop, therefore, applies biasing forces $F_1$ and $F_2$ against each of surfaces 206 and 280, respectively. It is of interest that each of these biasing forces is applied, at least to a reasonable approximation, in a direction that is normal to a tangent of the contacted surface at first tangent position 302 and at second tangent position 304. Further, the tangent positions, as well as forces $F_1$ and $F_2$ are arranged along a radial line R and are of equal magnitude. Over a given range of rotational motion of hub 160, that accommodates rotation of transducer arrangement 144 between the parked or unloaded position of FIG. 9a and the inner diameter position of FIGS. 9b and 9c, biasing force $F_1$ will remain oriented toward pivot center 401 at the contacting, tangent position of floating portion 300, irrespective of rotation of the hub. In this regard, floating section 300 is designated as $LS_0$ in FIG. 9c, using dashed lines, at a position that corresponds to positioning transducer arrangement 144 at its parked or unloaded position, with the biasing force indicated as $F_1'$, equal in magnitude to $F_1$ and oriented directly toward pivot center 401. Likewise, biasing force $F_2'$ is oriented oppositely and of equal magnitude against support wall 280. $F_1'$ and $F_2'$ will likewise remain radially aligned. Based on the foregoing, it should be appreciated that, for the given rotational range of operation and within a reasonable approximation, the rotating rolling loop imparts no rotational torque on hub 160. The rotating rolling loop can, therefore, be termed as a neutral bias force flex implementation. The latter may be useful, for example, in conserving battery power in a portable device, as well as providing an essentially unvarying influence from the rolling loop for purposes of reducing servo control concerns. Relatedly, an essentially constant amount of energy is stored in floating section 300 as it moves with rotation in a direction 312. That is, biasing force $F_1$ remains constant in magnitude between points 302 and 302', while biasing force $F_2$, likewise, remains constant in magnitude between points 304 and 304'.

Still referring to FIG. 9c, it is of interest that, for a given rotational movement of hub 160, a corresponding angular relocation of floating loop section 300, $\Delta\theta$ ($\theta_0$-$\theta_1$), is significantly smaller. For example, in one actual implementation, $\Delta$HGA from the outer diameter location of transducer arrangement 144 to its inner diameter location is approximately 37 degrees while a corresponding $\Delta\theta$ is only approximately 10 degrees. Thus, the angular extents of support wall 280, $\Delta$SW, in FIG. 6a, can be significantly less than $\Delta$HGA. For instance, $\Delta$SW can be slightly greater than $\Delta\theta$. The limited rotational movement of the rotating rolling loop is further illustrated by a swept rolling loop area 320 that is hatched and located between $LS_0$ and $LS_1$ in the present figure. Other characteristics of the rotating rolling loop should be recognized. For example, floating section 300 is always characterized by a constant magnitude of curvature with one orientation. In other words, the direction of curvature does not change over the length of section 300 and the floating section does not toggle its curvature over the operational range of motion of the HGA. As compared with a conventional S loop, as described above, it is considered that more controlled behavior is provided with a relatively small swept area. Further, it is considered that there is essentially no concern with respect to toggling. That is, the rotating rolling loop of the present disclosure maintains the direction of curvature of its floating portion under any circumstances of which Applicants are aware.

Referring to FIG. 2, the configuration of the rotating rolling loop described in detail herein further advantageously allows for locating components within at least a portion of a semicircular region 340 that is bordered by a diameter 342 that is indicated by a dashed line. In the present example, a portion of HGA connection assembly 220 can move into semicircular region 340 when HGA 122 is at its outer diameter position, as illustrated.

It should be appreciated that the behavior of flexible extension 154 can be customized in a wide variety of ways wherein the aforedescribed neutral bias embodiment can be considered as one form of a controlled bias torque embodiment. That is, in the neutral bias embodiment, the forces on the actuator from the flexible extension is controlled so as to always be directed toward the pivot center, however, this is not a requirement. That is, for some given range of rotation of the HGA, the forces generated by the flexible extension may produce a torque which tends to rotate the HGA at least over a given range of rotation. Such a controlled torque embodiment can behave in different ways over different sub-ranges of pivotal rotation of the HGA within an overall rotational range. As one example, for the pivotal sub-range that corresponds to the transducers flying over the disk surface, a neutral torque or bias can be applied to the HGA hub. However, when the HGA is being pivoted to unload the transducers over a pivotal sub-range that leads, for example, onto a ramp, a rotational torque or bias can be applied for purposes of assisting in the unloading sequence and/or for purposes of biasing the HGA toward the unloaded position, in order to better resist inadvertent loading of the transducers onto the disk surfaces. One embodiment of a controlled torque embodiment will be discussed immediately hereinafter.

Figure 10B:
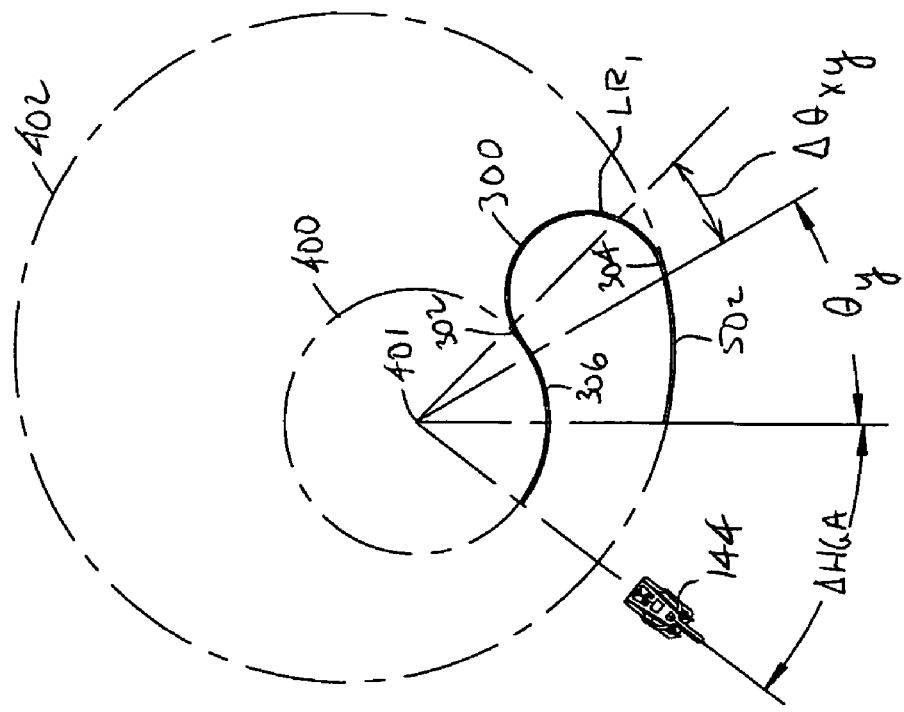
FIGS. 10a-10c are diagrammatic plan views which illustrate details with respect to a controlled bias torque embodiment.
Figure 10A:
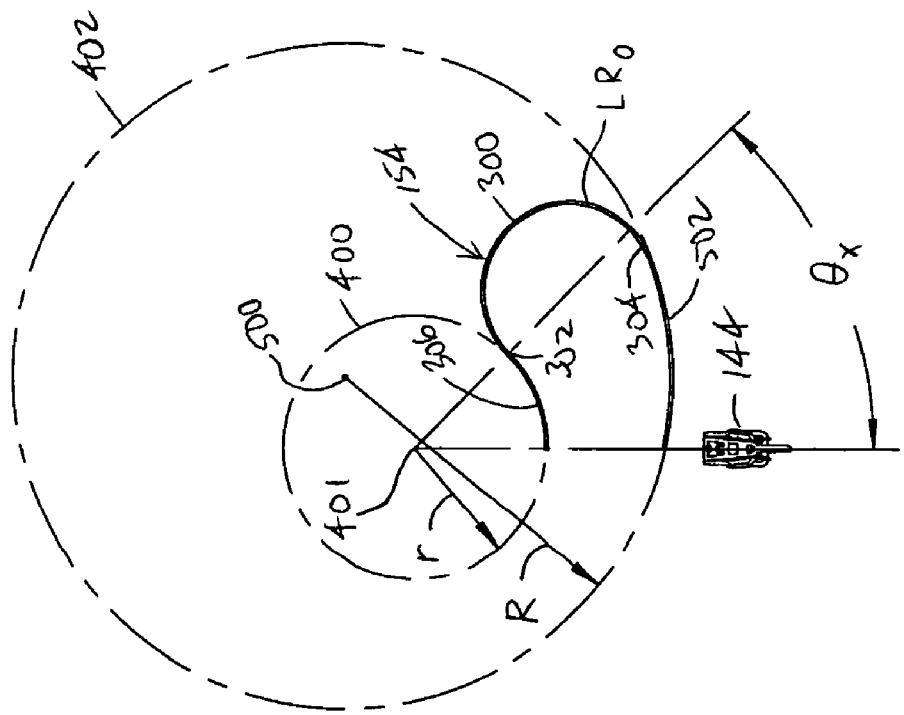

Referring to FIGS. 10a and 10b, it is initially noted, for the benefit of the reader, that a comparison of these figures with FIGS. 9a and 9b, respectively, will be of interest. Since a number of components are shared with these aforedescribed figures, descriptions of like components will not be repeated for purpose of brevity. According to one controlled torque embodiment, that is illustrated by FIGS. 10a and 10b, inner circle 400, having radius r and pivot center 401, is offset with respect to outer circle 402, having radius R extending from a center 500. Inner circle 400 is defined using a sidewall of the actuator hub, as described above, against which first portion 306 of the flexible extension rolls, while outer circle 402 represents a support surface 502 which generally corresponds to support wall 280 of FIG. 9c. In the present example, however, circle centers 401 and 500 are offset with respect to one another such that circles 400 and 402 are non-concentric. FIG. 10a illustrates flexible extension 154 with transducer arrangement 144 positioned at its parked position and with floating portion 300 of the flex extension designated as $LR_0$, while FIG. 10b illustrates flexible extension 154 with transducer arrangement 144 positioned at its inner diameter position and with floating portion 300 of the flex extension designated as $LR_1$. As a result of the non-concentric configuration, inner tangent point 302 and outer tangent point 304 no longer align on a radial line of circle 400, for reasons yet to be described.

Figure 10C:
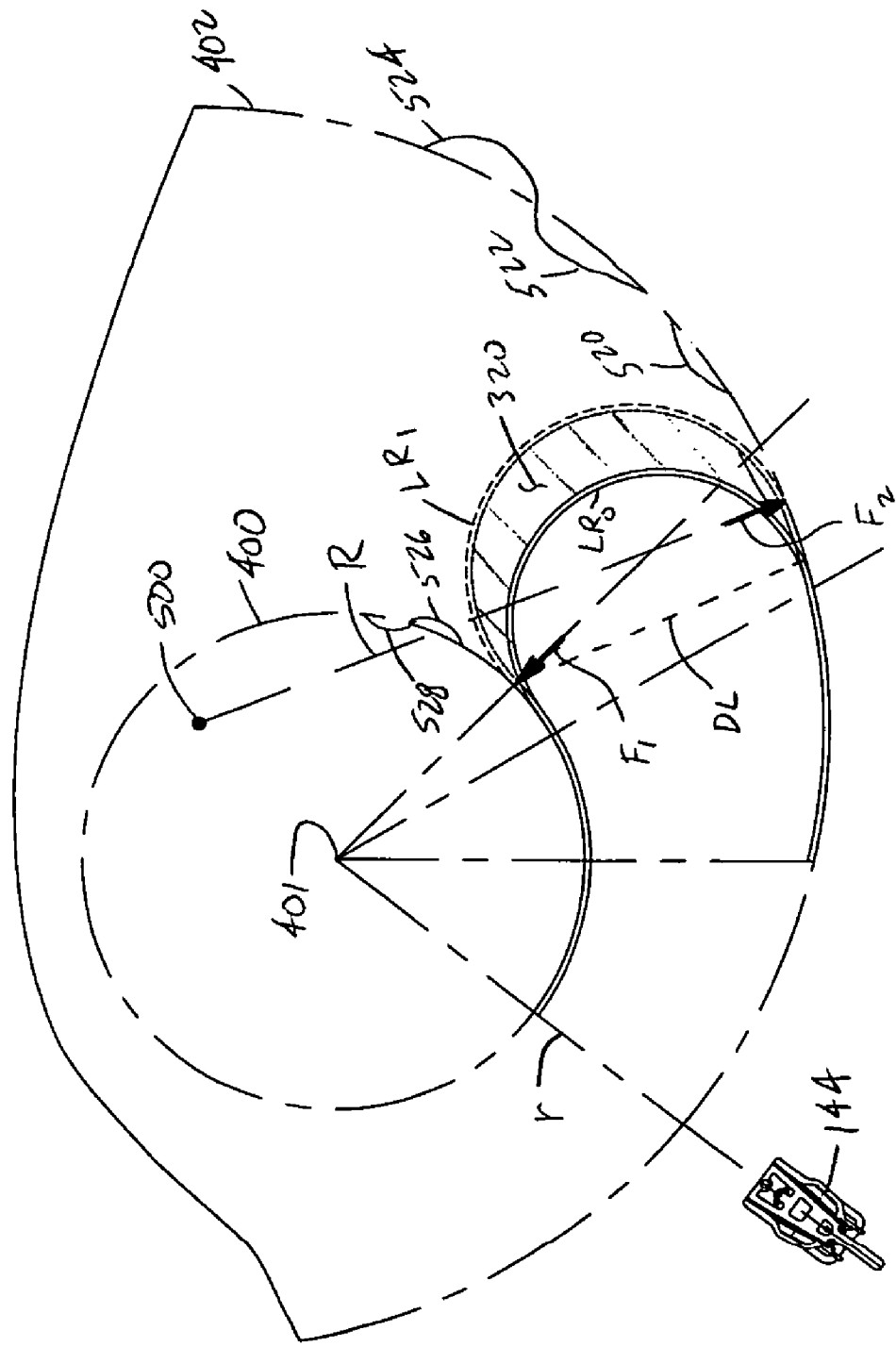

Turning to FIG. 10c, in conjunction with FIGS. 10a and 10b, the former is a further enlarged, partially cutaway view with flexible extension 154 and transducer arrangement 144 in a position that corresponds to the position of FIG. 10b. Again, it is noted that the reader may find a comparison of FIG. 10c with aforedescribed FIG. 9c to be useful. It should be mentioned that flexible circuit extension 154 is essentially captured between two non-concentric arc surfaces to form floating section 300. The tendency of floating section 300 of the flexible circuit extension is to straighten out in order to achieve its lowest energy state. The loop, therefore, applies biasing forces F1 and F2 against each of circles 400, representing surface 206 (seen, for example, in FIGS. 5, 6a and 6b), and against circle 402 which may be defined in any suitable way such as, for example, using a bracket as shown in FIG. 6a wherein surface 280 can be configured to correspond to an arc segment of circle 402. It is of interest that these biasing forces are no longer collinear. It is also of interest that a diameter of floating loop 300, indicated as DL using a dashed line in FIG. 10c, changes with respect to changes in ΔHGA, which also corresponds to movement between positions $LR_0$ and $LR_1$. For example, in FIG. 10c, it can be seen that DL will decrease as floating section 300 rolls in a clockwise direction, for example, from $LR_1$ toward $LR_0$. That is, ΔHGA is increasing. Floating portion 300, in this regard, can be considered as a spring, and increasing ΔHGA (i.e., clockwise movement of floating section 300 in the view of these figures) has the effect of compressing the spring, which requires contributing energy to the system. The energy contribution is stored as potential energy in the spring-like floating section which can be used in various beneficial manners. For example, the embodiment shown in FIGS. 10a-c serves as an example of a loop configuration that produces a torque on the actuator that assists in moving transducer arrangement 144 to a parked position. Further, this torque can serve to apply a bias that may be used to maintain the parked position. Accordingly, the torque that is applied to the head stack assembly is a function of its rotational position.

Referring to FIG. 10c, it should be appreciated that the use of non-concentric arc sections is not the only expedient that is available for purposes of manipulation of torque orientation and magnitude that may be applied to the actuator by flexible extension 154. As non-limiting examples, any number of features may be formed, as will initially be described with reference to outer circle 402. It should be appreciated that these features are not to scale for purposes of illustrative clarity and should be positioned such that flexible extension 154 appropriately rolls against these features to achieve a desired torque effect. Illustrated features include a symmetric bump 520, along with an asymmetric bump 522 as may be formed in a profile of an outer support surface, extending inward from outer circle 402. Further, a cavity or inverse bump feature 524 can be use in order to achieve a desired torque effect. Similarly, such features, as indicated by the reference numbers 526 and 528, may be formed in the hub sidewall, represented by inner circle 400. Torque influencing features may be used in any desired combination such as, for example, a series of features and/or features defined so as to extend from both inner circle 400 and outer circle 402 so as to cooperate in a particular way. In this regard, it should be appreciated that the use of these features provides for a concentric arrangement of inner circle 400 and outer circle 402, as representative of possible arc sections of support surfaces.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. In a disk drive including a disk supported for rotation thereof, an apparatus comprising:
    a head stack assembly including first and second portions, at least generally opposing one another, with a hub therebetween at least for pivotally supporting the first portion using a pivot arrangement and having a side margin that includes a circular configuration that is concentric with a center of rotation of the head stack assembly, said second portion is pivotally supported by said pivot arrangement for pivotal movement with said first portion, said first portion supports a coil, and said second portion supports a transducer arrangement for performing a data access using said disk;
    a flexible electrical interconnection arrangement having a length that extends between a first end and a second end, said first end being attached for rotation with the head stack assembly, said second end being attached to a given position in the disk drive for use in making a plurality of external electrical connections for said transducer arrangement and said coil, and a first portion of said flexible electrical interconnection arrangement, proximate to said first end, wherein said first portion urges against the side margin of said hub such that a rotation of the head stack assembly causes a length of said first portion to change over a given range of rotational movement of the head stack assembly; and
    a support wall for supporting a second portion of the flexible interconnection arrangement proximate to said second end, wherein said support wall also includes said circular configuration, concentric with said side margin of the hub in a radially spaced apart relationship therewith such that rotation of the head stack assembly changes a length of said second portion of the flexible interconnection arrangement which urges against the support wall.

2. The apparatus of claim 1 wherein a floating portion of the flexible interconnection arrangement extends between a first point of contact of the first portion of the flexible interconnection arrangement with the side margin of the hub and a second point of contact of the second portion of the flexible interconnection arrangement with the support wall and said first point and said second point are at least generally radially aligned throughout the given range of rotational movement of the head stack assembly.

3. The apparatus of claim 2 wherein an angular position of the floating portion is given as:

$$\theta = \frac{\theta_0(r+R) - r\alpha}{(r+R)}$$

where θ is a current angular position of the floating portion in relation to an original angular position $\theta_0$ of the floating portion which corresponds to an unloaded, parked position and which is measured from a reference axis, r is a radius of the hub sidewall, R is a radius of the support wall and α is a current angular position of the head stack assembly from said reference axis.

4. The apparatus of claim 1 wherein a floating portion of the flexible interconnection arrangement extends between a first point of contact of the first portion of the flexible interconnection arrangement with the side margin of the hub and a second point of contact of the second portion of the flexible interconnection arrangement with the support wall and is characterized, at least to an approximation, by a constant radius.

5. The apparatus of claim 1 wherein a floating portion of the flexible interconnection arrangement extends between a first point of contact of the first portion of the flexible interconnection arrangement with the side margin of the hub and a second point of contact of the second portion of the flexible interconnection arrangement with the support wall and the floating portion is characterized, at least to an approximation, by a semicircular shape.

6. The apparatus of claim 5 wherein said semicircular shape defines an area that is rotated with rotation of said head stack assembly and said area remains approximately constant during said rotation.

7. The apparatus of claim 6 wherein said head stack assembly supports an electrical connection arrangement that electrically connects the first end of the flexible interconnection arrangement to the head stack assembly such that at least a portion of the electrical connection arrangement is supported in said area for a given position of the head stack assembly.

8. The apparatus of claim 1 wherein a floating portion of the flexible interconnection arrangement extends between a first point of contact of the first portion of the flexible interconnection arrangement with the side margin of the hub and a second point of contact of the second portion of the flexible interconnection arrangement with the support wall and said head stack assembly is configured for moving through a given angular range during operation of said disk drive, and a given point on said floating portion moves in a loop angular range that is less than the given angular range of the head stack assembly.

9. In a disk drive including a disk supported for rotation thereof, a method comprising:
configuring a head stack assembly to include first and second portions, at least generally opposing one another, with a hub therebetween at least for pivotally supporting the first portion using a pivot arrangement, and using said pivot arrangement to pivotally support said second portion for pivotal movement with said first portion such that said first portion supports a coil and said second portion supports a transducer arrangement for performing a data access using said disk;
selecting a flexible electrical interconnection arrangement with a length that extends between a first end and a second end; and
attaching said first end for rotation with the head stack assembly and attaching said second end to a given position in the disk drive adjacent a support wall for use in making a plurality of external electrical connections for said transducer arrangement and said coil such that a first portion of said flexible electrical interconnection arrangement, proximate to said first end, urges against a side margin of said hub so that a rotation of the head stack assembly causes a length of said first portion to change over a given range of rotational movement of the head stack assembly and a second portion of said flexible electrical interconnection arrangement, proximate to said second end, urged against a side margin of the support wall;
wherein said support wall includes a curved configuration in a radially spaced apart relationship with the hub such that rotation of the head stack assembly changes a length of said second portion of the flexible interconnection arrangement urged against the support wall.

10. In a disk drive including a disk supported for rotation thereof, an apparatus comprising:
a head stack assembly including first and second portions, at least generally opposing one another, with a hub therebetween for pivotal rotation and said first portion supports a coil and said second portion supports a transducer arrangement for performing a data access using said disk in cooperation with the pivotal rotation; and
a flexible electrical interconnection arrangement having a length that extends between a first end and a second end, said first end being attached to the head stack assembly for pivotal rotation with said hub such that a floating portion of said length rolls, responsive to pivotal movement of the hub, between said hub and a support surface that is fixed with respect to pivotal movement of the head stack assembly and spaced away from said hub, said support surface having a curved configuration in a radially spaced apart relationship with the hub, said second end is attached to a given position in the disk drive for use in making a plurality of external electrical connections with said transducer arrangement and said coil, and said floating portion of said length follows an at least generally semicircular path between a first contact position on said hub and a second contact position on said support surface such that a floating loop diameter is defined between said first contact position and said second contact position, and said hub and said support surface are configured for changing said floating loop diameter responsive to pivotal movement of said head stack assembly so as to apply a resilient biasing torque to the head stack assembly which varies with said pivotal movement, the floating portion urging a first portion of the flexible electrical interconnection arrangement having a first length of the flexible electrical interconnection arrangement against the hub and urging a second portion of the flexible electrical interconnection arrangement having a second length against the support surface such that rotation of the hub causes the first and second lengths to change in opposite directions.

11. A disk drive comprising:
a disk;
a head stack assembly including a transducer positionable over the disk and a coil mounted to a hub, the hub mounted on a pivot;
a support wall spaced part from the hub and having a cylindrical inner surface; and
a flexible connector having a first end electrically coupled to the coil and a second end coupled to the support wall, the flexible connector including a first portion having a first length extending along the hub, a second portion having a second length extending along the cylindrical inner surface, and a bent portion extending between the first portion and the second portion and providing a biasing force urging the first portion against the hub and the second portion against the cylindrical inner surface;
wherein the flexible connector is disposed such that rotation of the hub causes the first and second lengths to change in opposite directions.

12. The disk drive of claim 11, wherein the hub includes a cylindrical outer surface and the first portion extends along the cylindrical outer surface.

13. The disk drive of claim 11, wherein the cylindrical outer surface is concentric with the cylindrical inner surface.

14. The disk drive of claim 11, wherein the cylindrical outer surface and cylindrical inner surface are not concentric.

15. A method for actuating a head stack assembly having a coil and a transducer arm mounted to a hub, the transducer arm positionable over the disk, the method comprising:
providing a support wall spaced part from the hub and having curved configuration;
providing a flexible connector having a first end electrically coupled to the coil and a second end coupled to the support wall, the flexible connector including a first portion having a first length extending along the hub, a second portion having a second length extending along the support wall, the flexible connector further comprising a bent portion extending between the first and second portions and exerting a biasing force urging the first portion into contact with the hub and the second portion into contact with the support wall; and rotating the hub such that a length of the first portion is increased and a length of the second portion is decreased.

16. The method of claim 15, further comprising rotating the hub such that the length of the first portion is decreased the length of the second portion is increased.

17. The method of claim 15, wherein hub comprises a cylindrical outer surface and the first portion extends along the cylindrical outer surface.

18. The method of claim 17, wherein the support wall includes a cylindrical inner surface and the second portion extends along the cylindrical inner surface.

19. The method of claim 18, wherein the cylindrical outer surface is concentric with the cylindrical inner surface.

\* \* \* \* \*

UNITED STATES PATENT AND TRADEMARK OFFICE
CERTIFICATE OF CORRECTION

PATENT NO. : 7,667,931 B1 Page 1 of 1
APPLICATION NO. : 11/385573
DATED : February 23, 2010
INVENTOR(S) : Brause et al.

It is certified that error appears in the above-identified patent and that said Letters Patent is hereby corrected as shown below:

Column 17
Line 5, delete "decreased" and insert --decreased and--
Line 7, delete "hub" and insert --the hub--

Signed and Sealed this

Eleventh Day of May, 2010

David J. Kappos
*Director of the United States Patent and Trademark Office*

UNITED STATES PATENT AND TRADEMARK OFFICE
CERTIFICATE OF CORRECTION

PATENT NO.       : 7,667,931 B1                                            Page 1 of 1
APPLICATION NO.  : 11/385573
DATED            : February 23, 2010
INVENTOR(S)      : Brause et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 940 days.

Signed and Sealed this

Seventh Day of December, 2010

David J. Kappos
*Director of the United States Patent and Trademark Office*